Figure 1:
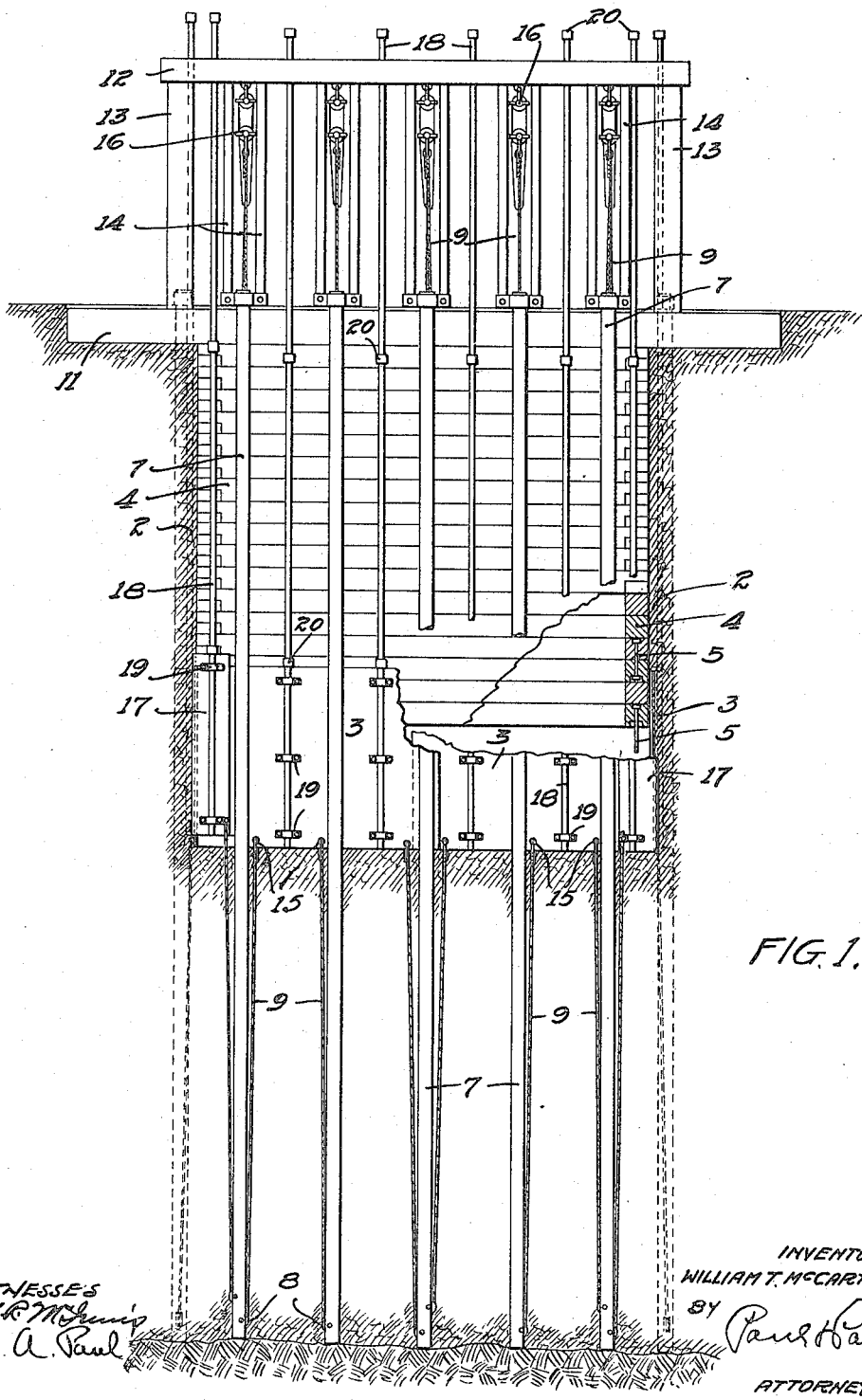

W. T. McCARTHY.
MEANS FOR SINKING SHOES OR FACING PLATES.
APPLICATION FILED AUG. 24, 1915.

1,202,545.

Patented Oct. 24, 1916.
2 SHEETS—SHEET 1.

INVENTOR
WILLIAM T. McCARTHY
BY
ATTORNEYS

W. T. McCARTHY.
MEANS FOR SINKING SHOES OR FACING PLATES.
APPLICATION FILED AUG. 24, 1915.
1,202,545.
Patented Oct. 24, 1916.
2 SHEETS—SHEET 2.
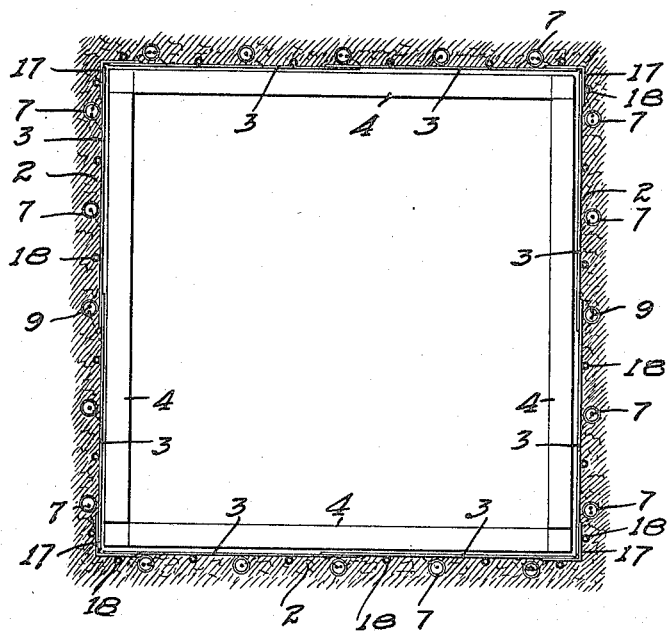
FIG. 2.
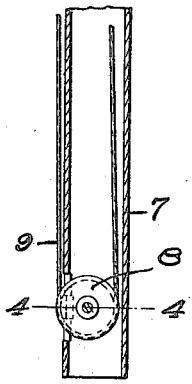
FIG. 4.
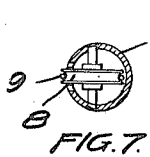
FIG. 7.
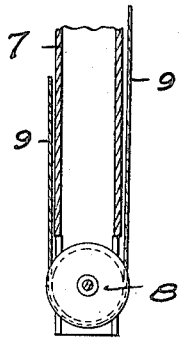
FIG. 5.
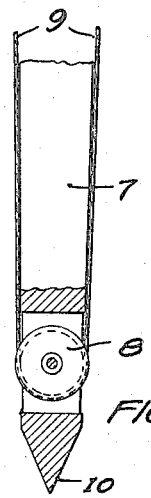
FIG. 6.
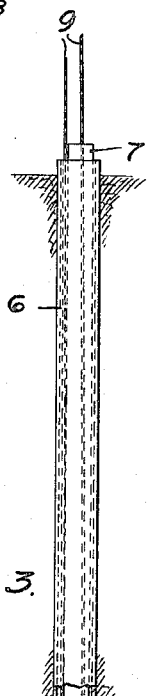
FIG. 3.
FIG. 8.
WITNESSES
M. P. McInnis
E. A. Paul
INVENTOR
WILLIAM T. McCARTHY
BY Paul & Paul
ATTORNEYS

UNITED STATES PATENT OFFICE.

WILLIAM T. McCARTHY, OF DULUTH, MINNESOTA.

MEANS FOR SINKING SHOES OR FACING-PLATES.

1,202,545.

Specification of Letters Patent.

Patented Oct. 24, 1916.

Application filed August 24, 1915. Serial No. 47,020.

*To all whom it may concern:*

Be it known that I, WILLIAM T. MCCARTHY, a citizen of the United States, and resident of Duluth, county of St. Louis, and State of Minnesota, have invented certain new and useful Improvements in Means for Sinking Shoes or Facing-Plates, of which the following is a specification.

My invention relates to means for sinking shoes or facing plates for shafts or other excavations, either vertical, horizontal or inclined river banks, and the like, and the object of the invention is to provide means by which a single plate or a series of plates can be easily and quickly sunk into the ground above which other plates or timbers may be placed to receive the lateral pressure and support the walls of a shaft or other excavation, or a river or other bank.

This device may be used in any place where it is desired to resist the lateral pressure of the earth.

A further object of the invention is to provide an apparatus of inexpensive construction that will be extremely efficient and durable.

The invention consists generally in various constructions and combinations, all as hereinafter described and particularly pointed out in the claims.

In the accompanying drawings forming part of the specification, Figure 1 is a vertical sectional view illustrating one form of the apparatus employed for forcing the plates into the ground. Fig. 2 is a transverse sectional view of the same. Fig. 3 is a detail view illustrating the means employed for sinking the uprights and the draft cables to the desired depth. Figs. 4, 5 and 6 are details showing various forms of the lower ends of the uprights with the draft cables connected thereto. Fig. 7 is a sectional view on line 4—4 of Fig. 4. Fig. 8 is a detail section showing two cables in connection with a single upright.

In the drawings, 2 represents the wall of a rectangular shaft and 3 the lining or facing plates that are to be sunk into the ground. As here shown the plates 3 are of metal such as boiler plates and are of any suitable size. They are preferably arranged with their ends overlapping, as shown in Fig. 2 of the drawings, when the excavation is of such size as to require a plurality of plates for each wall that is to be supported. As the plates are drawn or forced into the ground and the excavation proceeds, suitable timbers 4 are placed against the inner faces of said plates, said timbers being added from below and secured together by bolts 5 or other suitable means. As the excavation proceeds and the plates are sunk deeper into the ground these timbers form the supporting wall and receive the lateral pressure of the earth above the plates 3. Other metal plates may be used in place of the timbers as shown. I prefer, however, to use only a single series of plates and to hold the wall by the timbers that are inserted as the excavation proceeds. These plates may in fact be considered as shoes as they are sunk into the ground in advance of the timbers.

In sinking the plates in position I prefer to drive a series of pipes 6 into the earth to the desired depth. They may be sunk to bed rock. These pipes will usually be driven by a pile driver or other suitable means where the earth is of such character that this method of insertion is practicable, or if a rock strata is encountered the pipes may follow a drill until the desired depth is reached. After the pipes 6 have been inserted to the desired depth and along the line or lines where the walls of the excavation are to be located a series of uprights 7, each provided with one or more sheaves 8, are inserted in the pipes 6, and carried down to the desired depth, after which the pipes 6 are withdrawn. A cable 9 passes around each of the sheaves 8, its free end being left above the surface of the ground, and its other end being connected to a plate 3.

In Fig. 4 the upright 7 is shown consisting of a pipe having the sheave 8 located near its lower end, and with one side of the sheave projecting through a slot in the wall of the upright. The cable 9 in this instance has one length or stretch passing inside and one passing outside of the wall of said tubular upright.

In Fig. 5 the upright is shown of tubular form with the edges of the sheave 8 projecting through slots in its walls and with the cable 9 having both lengths outside of said upright.

In Fig. 6 the upright is shown as a solid rod or bar, having the sheave 8 mounted in a slot near its lower end and with both lengths of the cable arranged outside of said bar.

If preferred the upright may have a pointed lower end as represented at 10 in Fig. 6.

If preferred each upright may have two or more sheaves 8 mounted thereon in which case the axes of the sheaves will be arranged in angular relation to each other as shown in Fig. 8 of the drawings. In this instance a plurality of cables may be used with each upright.

A suitable anchoring frame is arranged at the surface of the ground as shown in Fig. 1 of the drawings. As here shown the frame consists of suitable horizontal timbers 11 and 12, the timbers 11 resting upon the surface of the ground, and the timbers 12 being supported above the surface by uprights 13, said timbers forming a strong durable frame preferably of suitable size to correspond substantially to the size and shape of the excavation to be made. Surrounding the upper end of each upright 7 is a standard 14 preferably made double and having its lower end firmly secured to the upper end of the upright 7 and its upper end secured beneath the horizontal timbers 12. The free end of the cable is connected to a suitable block and tackle 16, or other means for producing an upward pull thereon.

When the anchoring frame and the uprights are in position the plates that are to be sunk into the ground are placed against the outside of the uprights 7. One end of each cable is connected to the lower portion of a plate 3 in any suitable manner, such for example as by passing through a hole 15 in the plate and being secured therein, and power is then applied by means of the block and tackle or other suitable device, to the other ends of the cables and thereby the plates 3 are drawn downward into the ground.

If a shaft is to be sunk the plates 3 are arranged so as to inclose a rectangular space as illustrated in Fig. 2 of the drawings and suitable angular plates 17 may be provided to overlap the ends of the plates 3 at the corners. If it is desired to make a trench or longitudinal excavation two sets of plates may be arranged parallel to each other and at any desired distance apart. If it is desired to support a river or other bank a suitable longitudinal line of plates may be employed.

The anchoring frame may be secured to the ground by any suitable means so as to resist the upward thrust of the uprights when power is applied to pull the plates downward into the ground.

As means for guiding the plates and serving also as an additional or auxiliary means for forcing the plates into the ground, I provide guiding and driving tubes or rods 18, suitably connected to said plates and extending above the holding frame 12. These rods may be connected to the plates by suitable straps 19 or by any other suitable means. They are preferably provided with heads 20 that engage the upper edges of the plates 3. These rods are preferably made in separable sections so that as the sinking of the plates progresses additional sections may be added. The ends of the rods 18 are above the anchoring frame and assistance to the sinking of the plates may be rendered by pounding on the upper ends of said rods.

Where the plates overlap, as shown at the center of each straight wall in Fig. 2, two cables may be arranged in connection with each upright, and, if preferred, two cables may be arranged in connection with the uprights that are nearest the corners of the shaft, one cable being attached to the main plate and one to the corner plate, as illustrated in Figs. 1 and 2 of the drawings.

Where the uprights may be driven without injury to the cables, the solid form having pointed lower ends, illustrated in Fig. 6 of the drawings, may be employed, and the use of the tubes 6 into which the uprights are inserted may be omitted.

It will be noted that I need to employ only a single set of metal plates and that, as these plates which act as shoes, are forced into the ground, the earth inside, or against the plates, is removed and timbers 4 are put in place against or close to said plates, and, as the plates are lowered, the timbers receive the lateral pressure of the earth and support the same.

I do not limit myself to the details of construction herein shown and described, as the same may be varied in many particulars without departing from my invention.

I claim as my invention:

1. Means for sinking plates in making excavations or for other purposes, comprising uprights inserted in the ground and having sheaves near their lower ends, cables connected to the plates and passing downward around said sheaves and upward in proximity to said uprights and adapted to be connected to suitable pulling devices.

2. Means for sinking plates in making excavations or for other purposes, comprising uprights inserted in the ground and having sheaves near their lower ends, cables connected to the plates and passing downward around said sheaves and upward, in proximity to said uprights, to the surface of the ground, means for anchoring said uprights, and means for applying an upward pull to said cables.

3. Means for sinking plates in making excavations, or for other purposes, comprising uprights inserted in the ground and having sheaves near their lower ends, an anchoring frame to which the upper ends of said uprights are secured, cables connected to the plates and passing downward around said sheaves and upward in proximity to said uprights to the surface of the ground, and means supported by said anchoring frame for applying an upward pull to said cables.

4. Means for sinking plates in making excavations or for other purposes, comprising uprights inserted in the ground along lines in proximity to those to be occupied by the walls of the shaft, said uprights having sheaves near their lower ends, cables connected to the plates and passing downward around said sheaves and upward in proximity to said uprights and adapted to be connected to suitable pulling devices.

5. Means for sinking plates in making excavations and for other purposes, comprising uprights inserted in the ground and having sheaves near their lower ends, an anchoring frame to which the upper ends of said uprights are secured, cables connected to the plates and passing downward around said sheaves and upward in proximity to said uprights to the surface of the ground, means supported by said anchoring frame for supplying an upward pull to said cables and means connected with said anchoring frame for guiding said plates in their downward movement.

6. Means for sinking plates in making excavations and for other purposes, comprising uprights inserted in the ground and having sheaves near their lower ends, an anchoring frame to which the upper ends of said uprights are secured, cables connected to the plates and passing downward around said sheaves and upward in proximity to said uprights to the surface of the ground, means supported by said anchoring frames for supplying an upward pull to the cables and rods connected to said anchoring frame and to said plates for guiding said plates in their downward movement, and forming auxiliary means for sinking said plates by driving on said rods.

7. Means for sinking plates in making excavations or for other purposes comprising members inserted in the ground and having sheaves near one end, cables connected to the plates and passing around said sheaves in proximity to said members and adapted to be connected to suitable pulling devices.

In witness whereof, I have hereunto set my hand this 12th day of August, 1915.

WILLIAM T. McCARTHY.

Copies of this patent may be obtained for five cents each, by addressing the "Commissioner of Patents, Washington, D. C."